(No Model.)

E. D. BANGS.
LUBRICATOR.

No. 503,925. Patented Aug. 22, 1893.

Witnesses
Geo. W. Young
N. E. Oliphant

Inventor
Edwin D. Bangs.
By H. G. Underwood
Attorney

UNITED STATES PATENT OFFICE.

EDWIN D. BANGS, OF MILWAUKEE, WISCONSIN.

LUBRICATOR.

SPECIFICATION forming part of Letters Patent No. 503,925, dated August 22, 1893.

Application filed August 1, 1892. Serial No. 441,780. (No model.)

*To all whom it may concern:*

Be it known that I, EDWIN D. BANGS, a citizen of the United States, and a resident of Milwaukee, in the county of Milwaukee, and in the State of Wisconsin, have invented certain new and useful Improvements in Lubricators; and I do hereby declare that the following is a full, clear, and exact description thereof.

My invention has for its object to provide a simple and effective lubricator for rotating devices, such for instance as loose pulleys; and it consists in certain peculiarities of construction and combination of parts hereinafter described with reference to the accompanying drawings and subsequently claimed.

Figure 1:
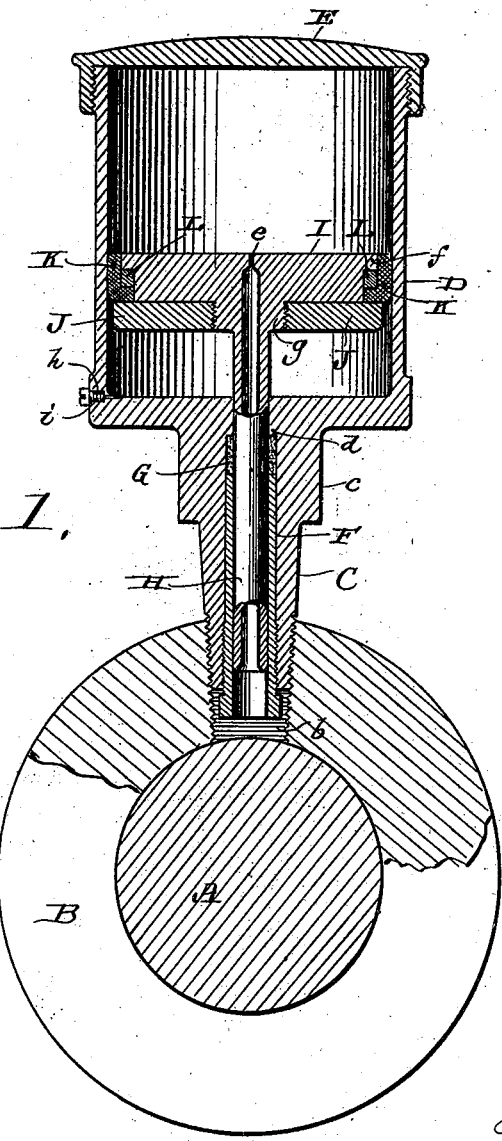

In the drawings: Figure 1 represents a vertical transverse section of my device as applied to the hub of a pulley loose on a shaft, and Fig. 2, a detail elevation partly in section illustrating, a piston and packing that constitute part of my invention.

Referring by letter to the drawings A represents a shaft, B the hub of a pulley loose on the shaft and provided with a screw-threaded opening at a right-angle to its axis. Engaging the screw-threaded opening in the pulley-hub is a correspondingly threaded hollow stem C that forms part of a cylindrical cup D and is preferably integral therewith. The cup is provided with a screw-cap E and the stem C has an angular portion $c$ for engagement with a wrench by which it is turned in the hub-opening above specified. The bottom of the cup D has a central opening communicating with the bore of the stem C, this opening and stem-bore being of differential diameters whereby an annular shoulder $d$ is formed. Compressed against the shoulder $d$, by a sleeve F having a screw-adjustment in the stem C, is a packing G of any suitable material, this packing, sleeve and stem constituting a stuffing-box for the hollow-rod H of a piston that works within the cup D, and is centrally provided with a minute opening $e$ that communicates with the bore of the rod, this bore being continued for a certain distance into said piston when said rod is integral therewith, as shown in Fig. 1.

Figure 2:
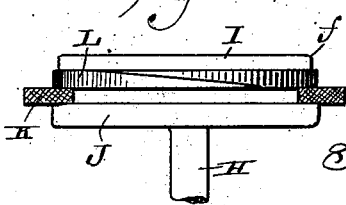

As shown, I prefer to make the piston head I in the form of a disk having an annular flange $f$ and a central screw-threaded boss $g$, the latter engaging a correspondingly threaded opening in a plate J, between which latter and said flange I confine the inner edge of a gasket K, and a split-ring L, of spring-material having overlapping wedge-shaped ends, as shown in Fig. 2. The piston being forced into the cup, the free portion of the gasket K is turned up between the two as shown in Fig. 1, and the split-ring L being compressed at the same time, the expansive tendency of the same will compensate for any possible wear on said gasket, whereby there is always an oil-tight joint between said piston and cup. As a matter of preference the stem-end of the cup is provided with a vent-hole $h$ normally closed by a screw $i$ preferably slabbed on one side for a portion of its length. At this point it is proper to state that the successful operation of my device depends on having the cup air-tight and therefore while the vent-hole $h$ will be found of advantage to lessen the time and effort necessary to force in the piston, when said cup is to be filled with oil, it must be afterward closed, and it is possible to do away with said vent-hole without departure from the spirit of my invention. In case the vent-hole and closing-screw are employed, a turn or two of this screw will be sufficient to open the vent, inasmuch as said screw is slabbed on one side for the greater portion of its length.

In practice the cap E is removed from the cup, the piston forced down against the stem-end of said cup and the latter filled with oil. Centrifugal force, incident to a rotation of the part to which my device is connected, causes the piston to press outward against the oil in the cup and this oil is thus forced through the central opening in said piston and finds its way along the hollow-piston-rod and cup-stem to the shaft or bearing for said rotative part, the small diameter of the piston-opening preventing a greater feed than is necessary to produce the best results in the matter of lubrication.

As before stated, it is absolutely essential that the oil-cup be air-tight, when my device is in operation, as otherwise the suction resultant from the movement of the piston will have the effect to draw the oil up along the outside of the piston-rod and back into the cup behind the piston; or in other words the oil will, in a great measure simply change its position in the cup from one side to the other of the piston.

Having now fully described my invention, what I claim as new, and desire to secure by Letters Patent, is—

1. A lubricator comprising an air-tight cup having a hollow stem for attachment to a rotative device, a centrally perforated piston in the cup a packing compressible in the stem, and a hollow rod that extends, from the perforated portion of the piston through the packing, substantially as set forth.

2. A lubricator comprising an air-tight cup having a hollow stem for attachment to a rotative device, a packing within the stem, a sleeve adjustable in said stem against the packing, a centrally perforated piston in the cup, and a hollow rod that extends from the perforated portion of the piston and engages the sleeve, substantially as set forth.

3. A lubricator comprising an air-tight cup having a hollow stem for attachment to a rotative device, a piston within the cup, consisting of a centrally perforated disk having an annular flange, and screw-threaded boss, a clamping-plate run on the boss, and a gasket and expansion ring held between the disk-flange and clamping-plate; and a hollow rod that extends from the perforated portion of the piston to within the cup-stem, substantially as set forth.

4. A lubricator comprising a cup having a hollow stem for attachment to a rotative device and a normally closed vent-hole, a centrally perforated piston in the cup, a hollow rod that extends from the perforated portion of the piston, and a packing compressible in the stem around the rod, substantially as set forth.

In testimony that I claim the foregoing I have hereunto set my hand, at Milwaukee, in the county of Milwaukee and State of Wisconsin, in the presence of two witnesses.

EDWIN D. BANGS.

Witnesses:
N. E. OLIPHANT,
H. H. MEIXSELL.